(12) United States Patent
Staughton (10) Patent No.: US 11,191,279 B2
(45) Date of Patent: Dec. 7, 2021

(54) APPARATUS FOR STORING ORGANIC MATERIAL

(71) Applicant: Feltrim Pastoral Company Pty Ltd, Howlong (AU)

(72) Inventor: Simon Staughton, Howlong (AU)

(73) Assignee: Feltrim Pastoral Company Pty Ltd, Howlong (AU)

( * ) Notice: Subject to any disclaimer, the term of this patent is extended or adjusted under 35 U.S.C. 154(b) by 335 days.

(21) Appl. No.: 15/771,581

(22) PCT Filed: Oct. 27, 2016

(86) PCT No.: PCT/AU2016/000366
§ 371 (c)(1),
(2) Date: Apr. 27, 2018

(87) PCT Pub. No.: WO2017/070729
PCT Pub. Date: May 4, 2017

(65) Prior Publication Data
US 2018/0310572 A1    Nov. 1, 2018

(30) Foreign Application Priority Data
Oct. 27, 2015    (AU) .................. 2015904389

(51) Int. Cl.
*A22B 7/00*    (2006.01)
*A22B 5/00*    (2006.01)
*B01D 29/31*    (2006.01)
*B01D 29/74*    (2006.01)
*F28F 19/01*    (2006.01)

(52) U.S. Cl.
CPC ............. *A22B 7/008* (2013.01); *A22B 5/00* (2013.01); *A22B 5/0076* (2013.01); *A22B 7/00* (2013.01); *B01D 29/31* (2013.01); *B01D 29/74* (2013.01); *F28F 19/01* (2013.01)

(58) Field of Classification Search
CPC ......... A22B 5/0076; A22B 5/00; A22B 7/008; A22B 7/00; B01D 29/31; B01D 29/74; F28F 19/01
See application file for complete search history.

(56) References Cited

U.S. PATENT DOCUMENTS

| | | | | |
|---|---|---|---|---|
| 1,912,651 A * | 6/1933 | Lee | ...................... | A21C 1/1495 |
| | | | | 165/104.31 |
| 2,086,072 A * | 7/1937 | Fauth | ..................... | A23B 4/031 |
| | | | | 426/426 |
| 2,089,215 A * | 8/1937 | Lomax | .................. | A47J 43/145 |
| | | | | 99/495 |
| 2,105,782 A * | 1/1938 | Fauth | ....................... | C11B 1/02 |
| | | | | 210/181 |
| 2,478,889 A * | 8/1949 | Harris | .................... | A23B 5/035 |
| | | | | 62/56 |
| 2,635,104 A * | 4/1953 | Chayen | .................... | C11B 1/06 |
| | | | | 554/23 |

(Continued)

*Primary Examiner* — Ljiljana V. Ciric
(74) *Attorney, Agent, or Firm* — Merchant & Gould P.C.

(57) ABSTRACT

An apparatus for storing organic materials includes: a body having an opening for receiving the organic materials to be stored; an outlet formed in the body through which the organic materials are unloaded from the body; and a cooling fluid circuit for circulating cooling fluid through the organic material collected by the hopper.

10 Claims, 10 Drawing Sheets

(56) References Cited

U.S. PATENT DOCUMENTS

| | | | | | |
|---|---|---|---|---|---|
| 2,722,315 | A | * | 11/1955 | Hapman | B01D 29/74 210/154 |
| 2,847,334 | A | * | 8/1958 | Hickey | A23L 5/57 426/287 |
| 2,943,845 | A | * | 7/1960 | Jaklitsch | F01M 5/005 165/87 |
| 3,022,646 | A | * | 2/1962 | Zebarth | A23B 4/062 62/381 |
| 3,097,501 | A | * | 7/1963 | Pappas | A23B 4/062 62/63 |
| 3,240,026 | A | * | 3/1966 | Van Dolah | F25D 13/065 62/63 |
| 3,250,086 | A | * | 5/1966 | Morris, Jr. | F25D 13/065 62/375 |
| 3,368,363 | A | * | 2/1968 | Buehler | F25D 9/005 62/64 |
| 3,395,549 | A | * | 8/1968 | Grimes | A61K 51/0489 62/63 |
| 3,407,872 | A | * | 10/1968 | Crane | A23B 4/062 165/109.1 |
| 3,410,101 | A | * | 11/1968 | Morris, Jr. | A23B 4/062 62/63 |
| 3,426,546 | A | * | 2/1969 | Crane | A23B 4/062 62/63 |
| 3,447,337 | A | * | 6/1969 | Nelson | A23B 7/148 62/318 |
| 3,475,178 | A | * | 10/1969 | Zebarth | A22B 7/008 426/495 |
| 3,491,679 | A | * | 1/1970 | Kelly | A23L 3/04 99/331 |
| 3,498,208 | A | * | 3/1970 | Longe | A23L 3/365 99/483 |
| 3,587,241 | A | * | 6/1971 | Hagen | F25D 25/04 62/63 |
| 3,595,672 | A | * | 7/1971 | Bajcar et al. | F25D 13/065 62/63 |
| 3,623,331 | A | * | 11/1971 | Buyens | F25D 31/006 62/63 |
| 3,736,860 | A | * | 6/1973 | Vischer, Jr. | F24C 7/087 99/339 |
| 3,797,267 | A | * | 3/1974 | Hagen | F25C 5/24 62/233 |
| 3,797,272 | A | * | 3/1974 | Huey | F25D 13/065 62/381 |
| 3,814,814 | A | * | 6/1974 | Wallace | A22B 7/00 426/2 |
| 3,910,175 | A | * | 10/1975 | Smith | A23B 7/06 99/474 |
| 3,982,481 | A | * | 9/1976 | Console | A23N 12/04 99/477 |
| 3,988,011 | A | * | 10/1976 | Kressin | A01J 25/02 366/312 |
| 3,993,788 | A | * | 11/1976 | Longenecker | A21B 1/10 426/243 |
| 4,026,035 | A | * | 5/1977 | Dyer | F25B 29/00 34/454 |
| 4,176,010 | A | * | 11/1979 | Dudek | C10L 9/08 201/14 |
| 4,190,577 | A | * | 2/1980 | Steele | C11B 1/04 426/615 |
| 4,384,412 | A | * | 5/1983 | Chance | D21F 5/10 34/119 |
| 4,387,630 | A | * | 6/1983 | Timbers | A23L 3/185 99/348 |
| 4,432,275 | A | * | 2/1984 | Zekert | A23N 5/002 100/211 |
| 4,471,002 | A | * | 9/1984 | Buckholz, Jr. | A23C 19/086 426/533 |
| 4,489,737 | A | * | 12/1984 | Wochnowski | F26B 25/22 131/302 |
| 4,498,249 | A | * | 2/1985 | Cooke | F28F 5/02 34/119 |
| 4,513,759 | A | * | 4/1985 | Wochnowski | F26B 25/22 131/303 |
| 4,529,609 | A | * | 7/1985 | Gaehring | A23L 7/111 426/532 |
| 4,534,118 | A | * | 8/1985 | Cabus | F26B 19/005 34/514 |
| 4,563,364 | A | * | 1/1986 | Carmichael | A23B 7/06 426/510 |
| 4,569,204 | A | * | 2/1986 | Ott | A23B 4/062 62/374 |
| 4,577,466 | A | * | 3/1986 | Cunningham | A23B 4/062 62/374 |
| 4,590,688 | A | * | 5/1986 | Steffero, Sr. | D21F 5/10 34/119 |
| 4,604,948 | A | * | 8/1986 | Goldhahn | A23B 7/06 99/470 |
| 4,688,476 | A | * | 8/1987 | Zittel | A23B 7/06 220/827 |
| 4,700,431 | A | * | 10/1987 | Artzt | D01G 9/20 19/105 |
| 4,700,546 | A | * | 10/1987 | Mattson | A23B 4/062 62/381 |
| 4,702,161 | A | * | 10/1987 | Andersen | A23B 7/06 99/470 |
| 4,770,236 | A | * | 9/1988 | Kulikowski | F26B 17/20 165/86 |
| 4,796,435 | A | * | 1/1989 | Mattson | A23B 4/062 62/381 |
| 4,796,523 | A | * | 1/1989 | Mette | A47J 27/18 99/443 C |
| 4,829,782 | A | * | 5/1989 | Mueller | F25C 1/12 165/115 |
| 4,829,890 | A | * | 5/1989 | Thomson | A01J 25/118 366/313 |
| 4,860,554 | A | * | 8/1989 | Innes | A23B 4/064 62/374 |
| 4,875,344 | A | * | 10/1989 | Zittel | A23L 3/361 62/381 |
| 4,942,810 | A | * | 7/1990 | Zittel | A23B 7/06 99/404 |
| 4,984,587 | A | * | 1/1991 | Neville | A24B 3/04 131/302 |
| 5,030,465 | A | * | 7/1991 | Curry | A23G 9/281 426/474 |
| 5,039,534 | A | * | 8/1991 | Adams | B03B 5/62 426/231 |
| 5,080,918 | A | * | 1/1992 | Beauvais | A23B 7/06 426/281 |
| 5,123,600 | A | * | 6/1992 | Takenaka | B09B 3/00 241/46.013 |
| 5,133,249 | A | * | 7/1992 | Zittel | A23B 7/06 134/132 |
| 5,146,841 | A | * | 9/1992 | Zittel | A23B 7/06 100/117 |
| 5,232,636 | A | * | 8/1993 | Cates | F28F 25/02 261/4 |
| 5,249,861 | A | * | 10/1993 | Thomson | B01F 7/00925 366/194 |
| 5,372,077 | A | * | 12/1994 | Yen | F23G 5/006 110/233 |
| 5,427,015 | A | * | 6/1995 | Zittel | A23B 7/06 134/132 |
| 5,433,849 | A | * | 7/1995 | Zittel | B01D 33/11 210/324 |
| 5,433,964 | A | * | 7/1995 | Norman | A21C 15/002 426/303 |
| 5,456,091 | A | * | 10/1995 | Zittel | A23L 3/185 62/375 |
| 5,531,034 | A | * | 7/1996 | Mentz | F26B 17/20 219/388 |
| 5,545,560 | A | * | 8/1996 | Chang | C05F 17/40 435/290.2 |
| 5,562,010 | A | * | 10/1996 | McGuire | B65G 33/34 74/126 |
| 5,592,869 | A | * | 1/1997 | Zittel | A23B 7/06 100/117 |

(56) References Cited

U.S. PATENT DOCUMENTS

| | | | | |
|---|---|---|---|---|
| 5,632,195 A * | 5/1997 | Zittel | A23B 7/06 | 134/132 |
| 5,645,233 A * | 7/1997 | Chen | B02C 18/142 | 241/100 |
| 5,680,821 A * | 10/1997 | Wright | F23G 5/444 | 110/110 |
| 5,692,382 A * | 12/1997 | Davison | A23L 3/361 | 62/345 |
| 5,752,431 A * | 5/1998 | Zittel | A23N 12/04 | 99/348 |
| 5,802,961 A * | 9/1998 | Hay | A23B 7/0053 | 165/111 |
| 5,865,536 A * | 2/1999 | Mechias | A23G 1/10 | 134/22.14 |
| 5,868,000 A * | 2/1999 | Morris, Jr. | A23B 4/064 | 62/374 |
| 6,089,037 A * | 7/2000 | Miller | A23B 4/066 | 62/314 |
| 6,263,785 B1 * | 7/2001 | Zittel | A23B 7/06 | 134/132 |
| 6,308,529 B1 * | 10/2001 | Bass | A22B 5/0076 | 62/381 |
| 6,397,622 B1 * | 6/2002 | Miller | F25D 13/065 | |
| 6,658,886 B1 * | 12/2003 | Bass | A23B 4/062 | 62/374 |
| 6,722,490 B1 * | 4/2004 | Bass | A22C 21/0053 | 198/657 |
| 6,817,284 B2 * | 11/2004 | Zittel | A23B 4/0053 | 99/405 |
| 7,168,846 B1 * | 1/2007 | Maupin | A23N 12/02 | 366/226 |
| 7,174,724 B2 * | 2/2007 | Morris, III | A22C 21/00 | 62/374 |
| 7,281,384 B2 * | 10/2007 | Morris, III | A22C 21/00 | 165/92 |
| RE40,232 E * | 4/2008 | Zittel | A23L 5/17 | 426/509 |
| 7,470,173 B2 * | 12/2008 | Morris, III | A22C 21/0061 | 452/173 |
| 7,500,426 B2 * | 3/2009 | Zittel | A23L 3/185 | 134/132 |
| 7,521,076 B1 * | 4/2009 | Wenger | B29C 48/295 | 426/510 |
| 7,735,415 B2 * | 6/2010 | Zittel | B01D 29/356 | 99/348 |
| 7,963,214 B1 * | 6/2011 | Wenger | A23K 40/20 | 99/348 |
| 8,087,348 B2 * | 1/2012 | Maupin | A23B 7/06 | 99/348 |
| 8,146,380 B1 * | 4/2012 | Wright | F28C 3/005 | 62/375 |
| 8,191,466 B2 * | 6/2012 | Maupin | A23N 12/06 | 99/348 |
| 9,089,143 B2 * | 7/2015 | Estes | A22B 5/0076 |  |
| 9,121,644 B2 * | 9/2015 | Badger | C10B 57/18 |  |
| 9,271,509 B2 * | 3/2016 | Estes | A22C 21/00 |  |
| 9,295,270 B2 * | 3/2016 | Miller | F28C 3/005 |  |
| 9,841,245 B1 * | 12/2017 | Wright | A23B 4/064 |  |
| 10,085,477 B2 * | 10/2018 | Maupin | A23N 12/04 |  |
| 10,143,135 B2 * | 12/2018 | Xu | A01F 12/48 |  |
| 10,149,486 B2 * | 12/2018 | Hognason | A23B 4/09 |  |
| 10,174,257 B2 * | 1/2019 | Hill | F27D 15/02 |  |
| 10,258,017 B2 * | 4/2019 | Nelles | B01F 15/068 |  |
| 10,709,161 B2 * | 7/2020 | Zittel | B01D 29/6476 |  |
| 2004/0011725 A1 * | 1/2004 | Harle | B01D 29/6492 | 210/350 |
| 2004/0107638 A1 * | 6/2004 | Graham | C10J 3/30 | 48/197 FM |
| 2004/0144123 A1 | 7/2004 | Bass | | |
| 2006/0037898 A1 * | 2/2006 | Choi | B09B 3/00 | 210/173 |
| 2007/0089805 A1 * | 4/2007 | Swaan | F26B 17/102 | 144/1.1 |
| 2009/0130443 A1 * | 5/2009 | Lustiger | C08J 5/046 | 428/401 |
| 2011/0136971 A1 * | 6/2011 | Tucker | C01B 32/30 | 524/587 |
| 2011/0203778 A1 | 8/2011 | Estes et al. | | |
| 2012/0042789 A1 * | 2/2012 | Hognason | F25D 3/127 | 99/483 |
| 2012/0258021 A1 * | 10/2012 | Badger | C10B 49/16 | 422/203 |
| 2013/0312854 A1 * | 11/2013 | Eriksen | H05K 7/20327 | 137/544 |
| 2014/0150650 A1 * | 6/2014 | Walker | F24H 1/34 | 95/66 |
| 2014/0202659 A1 | 7/2014 | Sekiguchi et al. | | |
| 2015/0366229 A1 * | 12/2015 | Trembley | A23B 4/062 | 62/64 |
| 2018/0187085 A1 * | 7/2018 | Ladygin | C10B 33/02 | |
| 2019/0055946 A1 * | 2/2019 | Luxford | B01D 29/31 | |
| 2019/0233316 A1 * | 8/2019 | Miller | A22B 7/00 | |
| 2019/0271514 A1 * | 9/2019 | Trowbridge | F04D 29/703 | |
| 2019/0274320 A1 * | 9/2019 | Shell | A23L 3/0155 | |

\* cited by examiner

APPARATUS FOR STORING ORGANIC MATERIAL

RELATED APPLICATION(S)

This application is a National Stage Application of PCT/AU2016/000366, filed 27 Oct. 2016, which claims benefit of Serial No. 2015904389, filed 27 Oct. 2015 in Australia and which applications are incorporated herein by reference. To the extent appropriate, a claim of priority is made to each of the above disclosed applications.

FIELD OF INVENTION

The present invention relates to a system and apparatus for storing and collecting organic material, and in particular, to a system and apparatus for storing and collecting organic material from originating sites to be used in food related applications.

BACKGROUND OF THE INVENTION

In the production of pet food, the ability to access fresh and high quality organic products, such as offal, is fundamental in providing a high quality product. Typically, offal includes the internal organs and entrails of animal, such as the animal's lungs, liver and various connective tissues, which are the result of a slaughtering process. Assess to such organic products is typically through registered abattoirs and the like, which are set-up to slaughter animals for domestic meat purposes, and the offal is typically a by-product of this process that would otherwise be discarded.

During the livestock slaughtering process, the offal is typically transferred from an evisceration area of the kill floor to a collection area, where the offal is stored in a plurality of collection skips, generally having a volume of around one cubic metre. The collection skips are able to be wheeled around the site are structured to collect and chill the offal for collection. Conventional skips typically employ a woven mesh material located at an opening formed in the bottom of the skip, which is located over a drain sump. In order to chill the collected offal, chilled water is poured into the skip and allowed to drain through the offal and out of the skip via the opening and onto the floor. The resultant waste water drains into the sump and is pumped over heat exchange plates, before recirculating through sprays over the offal again.

Typically, at the end of each day, the skips are collected and transported to a pet food manufacturer or an agent for further processing of the offal. In cases where the pet food manufacturer is located close to the abattoir, the skips filled with offal may be collected and transported to the manufacturer's site several times in a day and depending upon the distance to be travelled and the regularity of collection, ice may not be used to chill the skips.

However, due to the conventional locations of abattoirs, it is often necessary for the offal to be transported long distances between the abattoir and pet food manufacturer. As a result, in such instances maintaining the freshness of the offal can be problematic, particularly in regions of high temperatures and during summer. This can be a problem, even in situations where ice is used to chill the skips.

Conventional offal storage and collection systems can also be labour intensive, costly and subject to human handing error. The high cost of ice and water and the manual labour involved in chilling the offal in each of the skips adds to the cost of the storage and collection process. In addition, as the primary attention of most abattoirs is directed to handling and processing of animal carcasses for meat production for human consumption, minimal resources are typically provided by the abattoir to facilitate the storage and collection process due to the relative low value of offal, especially in relation to human consumption.

Thus, there is a need to provide a system and apparatus for the collection and storage of organic material invention which overcomes or ameliorates one or more of the disadvantages or problems described above, or which at least provides the consumer with a useful choice.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

According to a first aspect, the present invention provides an apparatus for storing organic material, the apparatus including a hopper for collecting the organic materials, an outlet for unloading the organic material from the hopper, and a cooling fluid circuit for circulating cooling fluid through the organic material collected by the hopper.

Advantageously, the apparatus collects the organic material immediately after evisceration, and reliably stores the material in an enclosed environment in compliance with food safety regulations. The cooling fluid circuit also provides automatic cooling to preserve the organic material in a reliable and cost effective manner. Moreover, the outlet allows convenient and automatic unloading of the organic material into any suitable container for transportation to various pet food manufacturing facilities. The apparatus thereby provides an automatic system for collecting, storing, cooling and unloading the offal for further processing. The apparatus advantageously minimises the manual labour required for its operation, thereby increasing reliability and reducing costs.

The hopper may include a drain trough for draining fluids from the hopper. The drain trough may extend the length of the floor of the hopper.

The apparatus may include a transfer mechanism for assisting the transfer of organic material from the hopper to the outlet. The transfer mechanism may include one or more auger shafts. Typically, the transfer mechanism includes two or more auger shafts extending along the floor of the hopper. The auger shafts may be operatively configured to rotate relative to one another so as to move the organic material from hopper to the outlet.

The transfer mechanism may be associated with a sieve system for draining fluid from the organic material. The sieve system may be associated with the drain trough. More particularly, the auger shafts may be further configured to operate as a sieve system from draining fluid from the hopper. Each auger shaft may be associated with a drain trough. The auger shafts may have intermeshing threads which operate as a sieve system.

The threads of each auger shaft may be spaced from threads of an adjacent auger shaft by a predetermined distance so as to provide optimal operation as a sieve. The intermeshing threats of adjacent threads of auger shafts may provide a multi-layer sieve system. In one embodiment, a top portion of the auger shafts provide a first mesh having a first size, an intermediate portion of the auger shafts provide a second mesh having a second side, and a bottom portion of the auger shafts provide a third mesh having a third size. Typically, due to the circular cross sectional shape of each auger shaft, the first mesh is generally larger in size than the second mesh and the third mesh. In one embodiment, the size of apertures of the first mesh is roughly 25 mm×100 mm, the size of apertures of the second mesh is roughly 13 mm×12 mm, the size of apertures of the third mesh is roughly 6 mm×25 mm.

During operation of the apparatus, fluid from the organic material is drained through the sieve and collected by the drain trough for filtering and cooling by the cooling fluid circuit.

In some embodiments, the transfer mechanism includes two sets of auger shafts. Each set of auger shafts may include four auger shafts. The orientation of the threads of the auger shafts in one set may oppose the orientation of the threads of the auger shafts in the other set. The rotational direction of the auger shafts in the same set may be the same. The direction of rotation direction of the auger shafts in one set may be opposite to the direction of rotation of the auger shafts in the other set. During operation, the two sets of auger shafts rotate in opposing directions away from each other so as to push the organic material towards one end of the hopper towards the outlet. In particular, the auger shafts of one set on a left side of the hopper rotates in an anti-clockwise direction, and the auger shafts of the other set on a right side of the hopper rotates in a clockwise direction.

Advantageously, the arrangement of the auger shafts results in a highly effective, non-blocking sieve system to allow drainage of recirculated chilled fluid from the organic material for reuse. Moreover, the auger shafts may be configured relative to one another such that the transfer mechanism is self-cleaning. Typically, the movement of blades of one auger shaft can effectively clean the blades of an adjacent auger shaft.

In some embodiments, the auger shafts may not intermesh. Adjacent auger shafts may be separated by a divider.

The apparatus may include an unloading mechanism to facilitate movement of the organic material through the outlet for unloading the organic material.

The unloading mechanism may include an auger shaft extending along a length of the outlet. The auger shaft may be configured to rotate about its axis to facilitate unloading of the organic material from the outlet.

The cooling fluid circuit may include a heat exchanger for maintaining the cooling fluid below a predetermined temperature.

The cooling fluid circuit may include a filter system for filtering the cooling fluid.

The filter system may be self-cleaning. Moreover, the filter system includes an in-line filter having an in-line barrel filter and barrel sieve. The operation of the filter system may include high speed rotation of the filter barrel.

According to another aspect of the invention, there is provided a filter for filtering fluid including a sieve for filtering the fluid, the sieve having a generally cylindrical shape and configured to spin about its central axis, a driver for driving the spinning motion of the sieve to facilitate cleaning of the filter.

The filter further includes a spindle and spray bar, the sieve being mounted to the spindle and spray bar and configured to spin with the spindle and spray bar during a self-cleaning cycle.

The spindle and spray bar being configured to facilitate spraying of cleaning fluid to clean an internal wall of the sieve.

The driver including a turbine assembly. The turbine assembly may be driven by a high pressure fluid supply.

According to another aspect of the invention, there is provided a method of cleaning a filter including spinning a sieve of the filter about on its central axis.

The method may further include spraying a cleaning fluid to clean an internal surface of the sieve.

According to a further aspect of the invention, there is provided an apparatus for storing organic material as previously described having a filter as previously described above.

In order that the invention be more readily understood and put into practice, one or more preferred embodiments thereof will now be described, by way of example only, with reference to the accompanying drawings.

Reference throughout this specification to 'one embodiment' or 'an embodiment' means that a particular feature, structure or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristic described herein may be combined in any suitable manner in one or more combinations.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The present invention will be described below in relation to its application to an apparatus for collecting and storing offal for pet food manufacturing purposes. However, it will be appreciated that the present invention could be equally applied to a variety of other purposes, including for collecting and storing organic matter for human consumption, as will be appreciated by those skilled in the art.

Figure 1A:
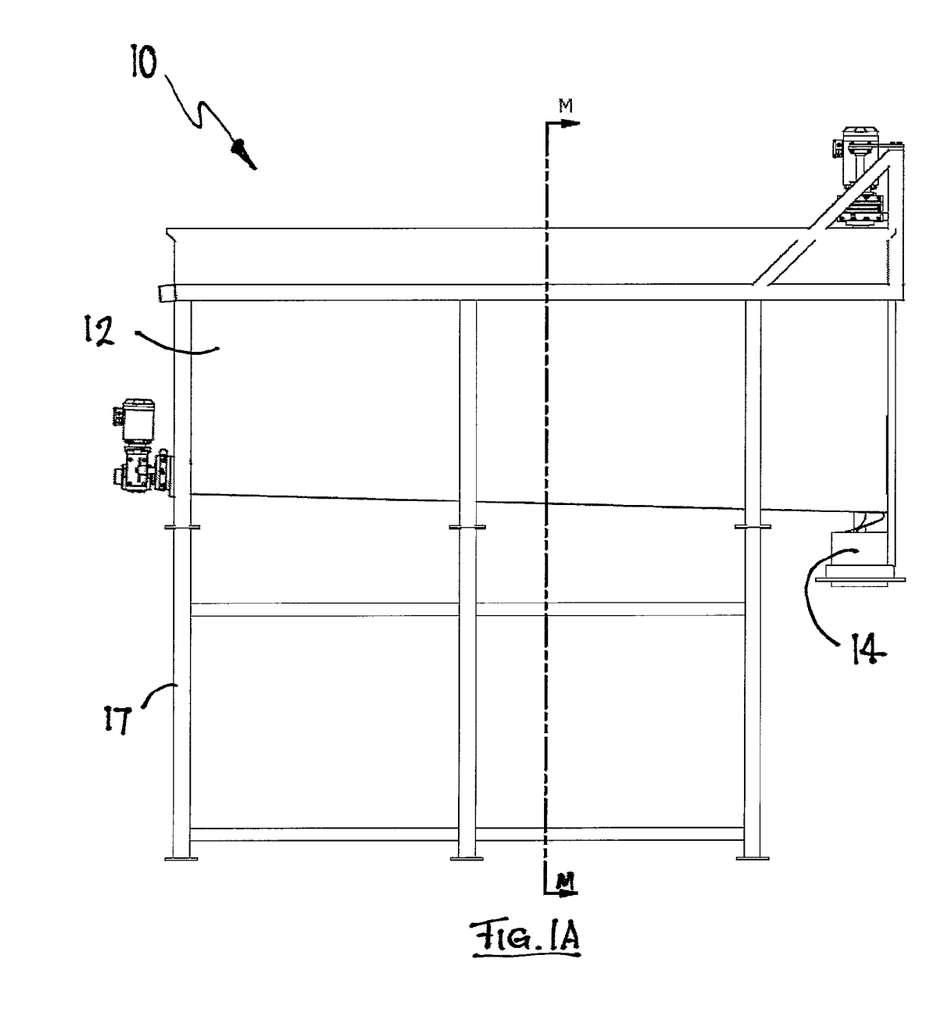
FIG. 1A is a side view of the body of an apparatus for storing organic material according to an embodiment of the present invention.
Figure 1B:
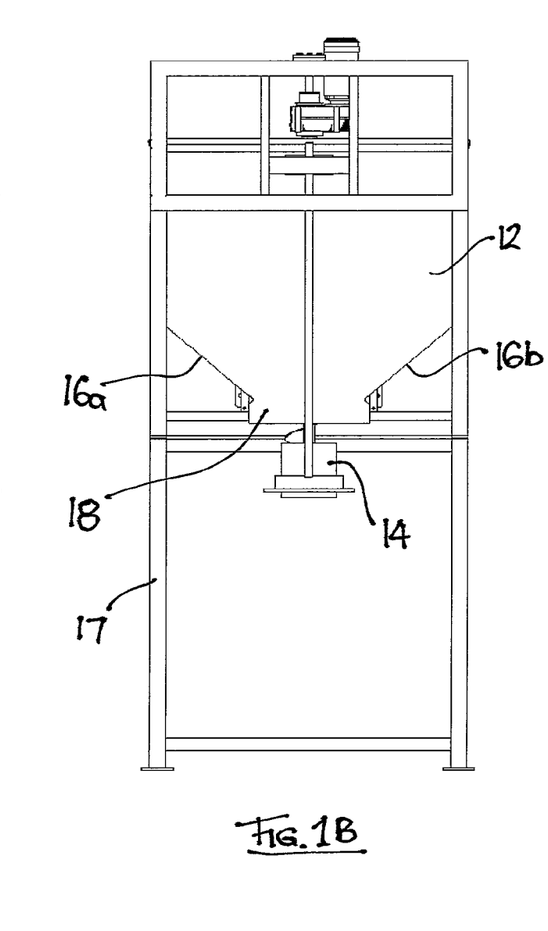
FIG. 1B is an end view of the body of the apparatus of FIG. 1B.

A body of an apparatus for storing organic material is shown in FIGS. 1A and 1B. The body 10 includes a hopper 12 for collecting the organic materials and an outlet 14 for unloading the organic material from the hopper 12. The hopper 12 is elevated and supported by a support frame 17. The apparatus further includes a cooling fluid circuit (not shown) for circulating cooling fluid through the organic material collected by the hopper 12. The outlet 14 has a knife gate (not shown) for sealing the outlet 14 and for stopping the dispatch of organic material at the end of an unloading cycle. The cooling fluid circuit will be described in further detail below.

In one embodiment, the hopper 12 and the support frame 17 are both made from stainless steel. The hopper may be of any suitable dimension. For example, the hopper may be roughly 4.5 m×1.4 m×2.3 m high or have a capacity of roughly 14 cubic meters. In this embodiment, the support frame 17 may be roughly 4 m×2.5 m×2.5 m high.

Figure 2A:
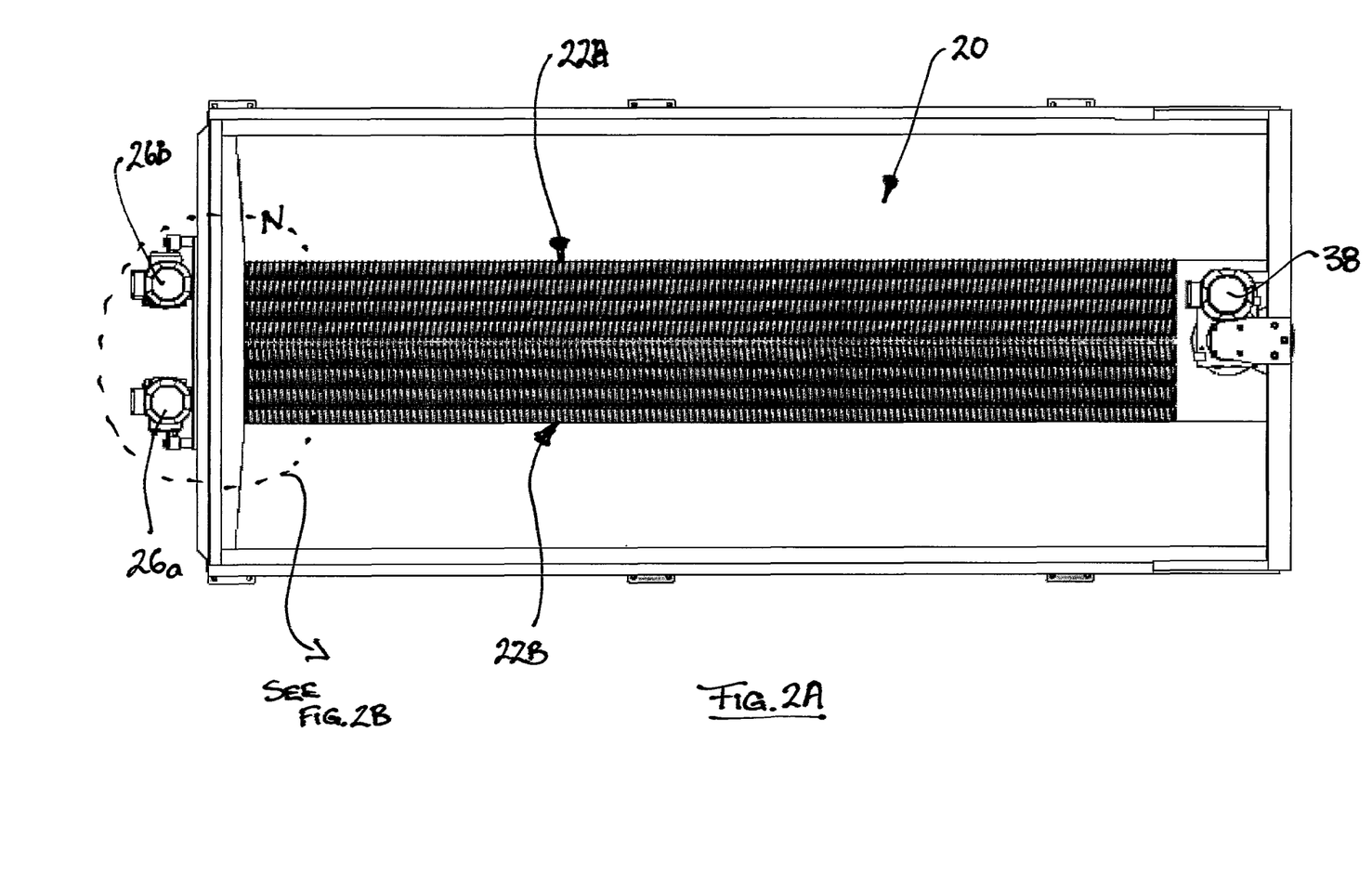
FIG. 2A is a top view of the body of the apparatus of FIGS. 1A and 1B.

As shown in FIG. 2A, the hopper 12 has an open top for collecting organic material such as offal from an evisceration area or kill floor of an abattoir. The organic material may be manually loaded into the hopper 12. In one embodiment, the organic material is collected in a separate holding tank on the kill floor of an abattoir and the organic material is automatically pumped into the hopper 12 once the holding tank is filled to a predetermined level. As more clearly shown in FIGS. 1A and 1B, the floor is generally funnel shaped having two oppositely inclined floor portions 16A, 16B, and an intermediate floor portion 18 located between the inclined floor portions 16A, 16B. As more clearly shown in FIG. 1B, the inclined floor portions 16A, 16B are inclined towards one another. As more clearly shown in FIG. 1A, the intermediate floor portion 18 is gradually inclined towards the outlet 14, so as to facilitate movement of organic material towards the outlet 14 during unloading.

The body 10 further includes a transfer mechanism 20 disposed along the intermediate floor portion 18 for assisting the transfer of organic material from the hopper 12 to the outlet 14.

Figure 2B:
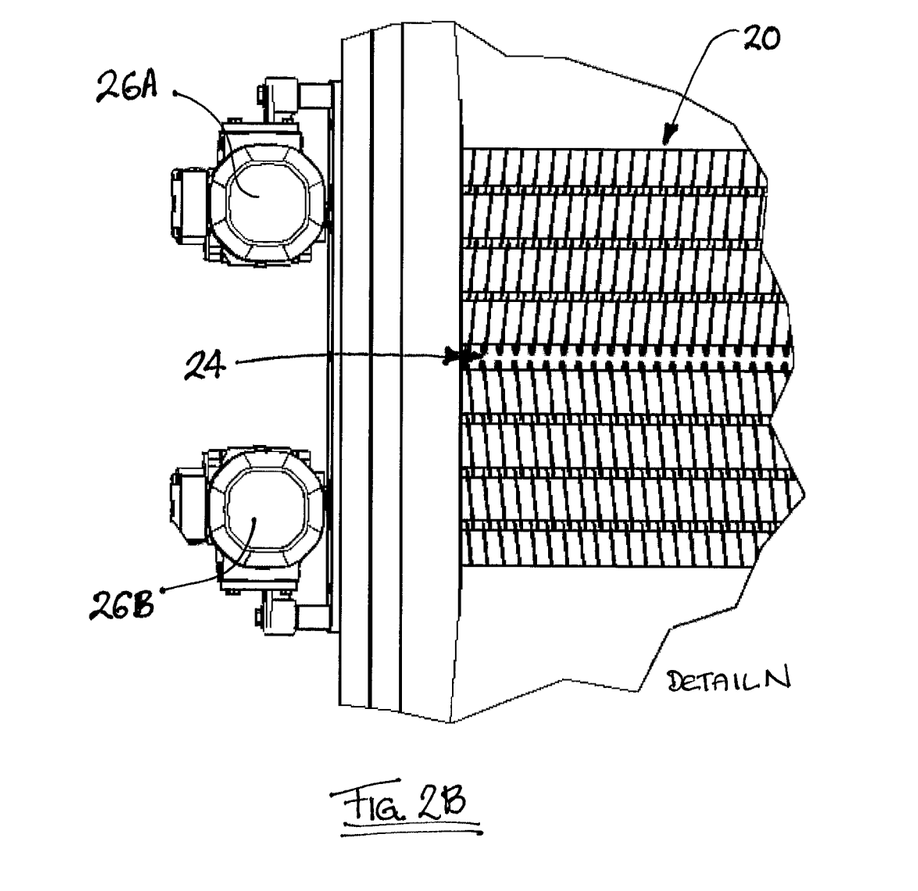
FIG. 2B is a cross-sectional view of section N of FIG. 2B.
Figure 2C:
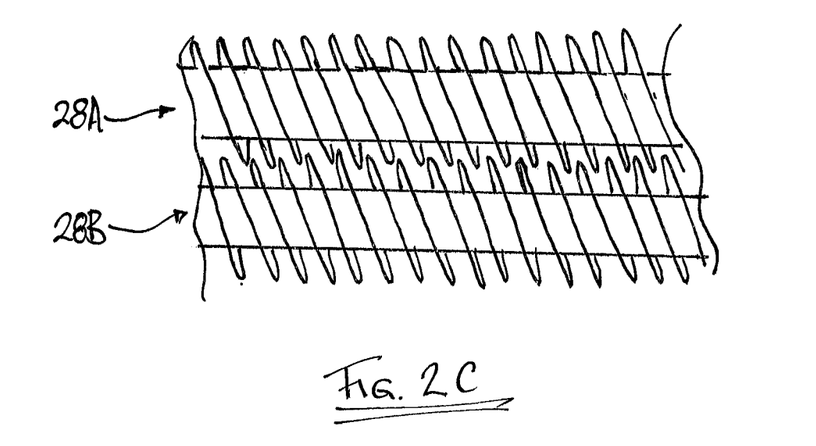
FIG. 2C is a close up detailed view of two adjacent auger shafts of the apparatus of FIGS. 1A to 2B.

As more clearly shown in FIGS. 2A and 2B, the transfer mechanism 20 includes two sets of auger shafts 22A, 22B the two sets of auger shafts 22A, 22B are generally symmetrical about a centre-line of the flat floor portion 18. As shown in FIG. 2C, the threads 28A of one auger shaft 22A is offset from the threads 28B of an adjacent auger shaft 22A in the pair. In this configuration, the threads of one auger shaft effectively removes organic material between the threads of an adjacent auger shaft to thereby enable self-cleaning of the auger shafts during operation.

Each set of auger shafts 22A, 22B includes four auger shafts (see FIG. 2B, 3A, 3B) and each set of auger shafts 22A, 22B is operatively configured to rotate to one another so as to move the organic material along the hopper 12 to the outlet 14. More particularly, all four auger shafts in each set 22A and 22B rotates in the same direction during operation. When viewed from a left side of FIG. 2A, the auger shafts in set 22A rotate anti-clockwise during operation, and the auger shafts in set 22B rotate clockwise during operation such that the two sets of auger shafts 22A, 22B rotate away from one another so as to push the organic material away from the centre line 24 of the flat floor portion 18 and gradually towards the outlet 14. The inclined floor portions 16A, 16B of the hopper 12 act as a drive rail to move the organic material towards the outlet 14. Each set of auger shafts 22A, 22B is respectively driven by an independent motor 26a, 26b.

Figure 3A:
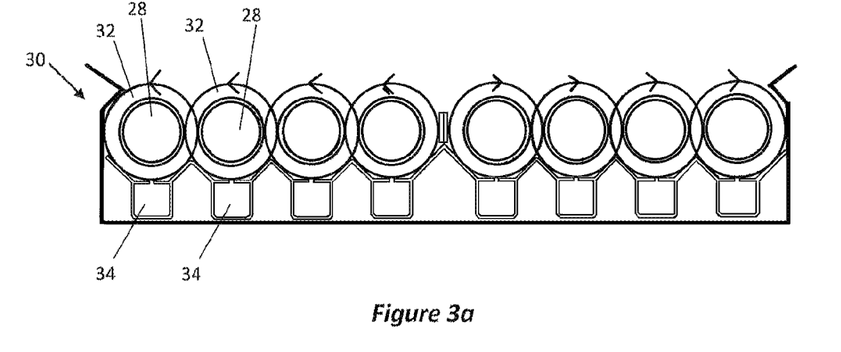
FIGS. 3A and 3B are schematic diagrams of transfer and draining mechanism of the apparatus of FIGS. 1A to 2B.
Figure 3B:
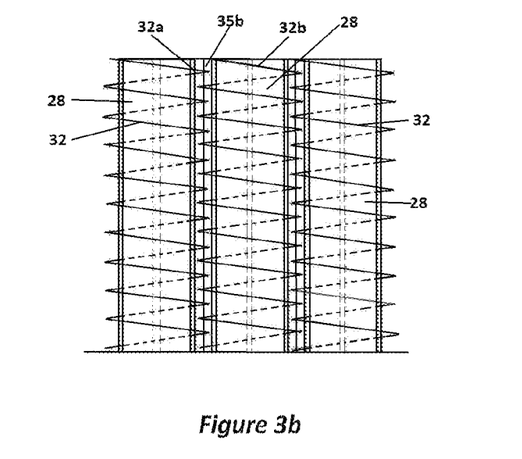

The transfer mechanism 20 also provides a sieve system 30 for draining fluid from the organic material. As more clearly shown in FIGS. 3A and 3B, each auger shaft 28 of a set 22A, 22B has a helical thread 32. The auger shafts 28 are positioned side by side and the thread 32 of adjacent auger shafts 28 are offset so that thread projections 32a are received in space 35b between the threads 32b of the adjacent shaft 28 (FIG. 3B).

In this manner, the intermeshed auger shafts 28 can also operate as a sieve system 30 having three overlapping sieves. In particular, a top portion of the auger shafts 28 provide a top sieve having a mesh size of roughly 25 mm×100 mm; an intermediate portion of the auger shafts 28 provide an intermediate sieve having a mesh size of roughly 13 mm×12 mm; and a bottom portion of the auger shafts 28 provide a bottom sieve having a mesh size of roughly 6 mm×25 mm.

As the auger shafts 28 rotate to transfer the organic material along the hopper 12 towards the outlet 14 during operation, the rotation of the auger shafts 28 also functions to unblock any material from the sieve system 30 during drainage. In particular, the movement of a threaded projection 32a in a space 35a between adjacent threaded projections 32b removes any material from the space 35a, thereby unblocking the sieve system 30.

As shown in FIG. 3A, each auger shaft 28 is associated with a drain trough 34. Fluid drained from the organic material is collected through the sieve system 30 and by the drain trough 34 located below each auger shaft 28. The drained fluid is then filtered and cooled by the cooling fluid circuit before being redirected back into the hopper 12 for further cooling of the organic material.

Figure 3C:
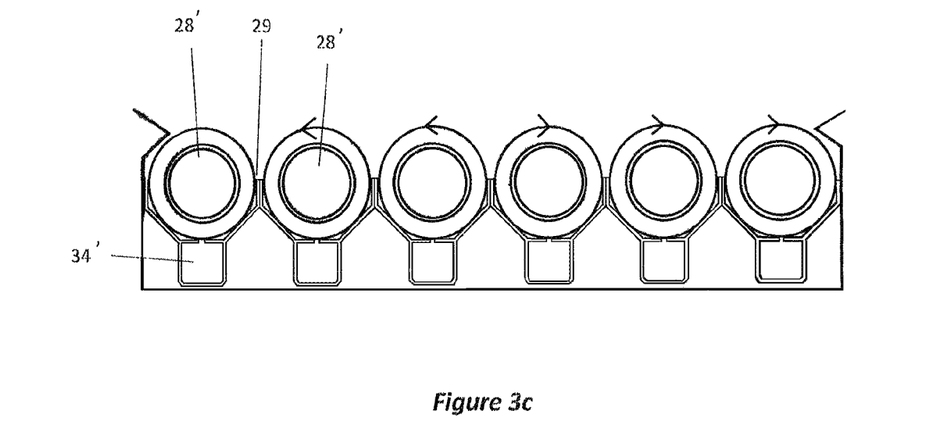
FIG. 3C is a schematic diagram of the transfer and draining mechanism according to another embodiment of the invention.

According to an alternative embodiment as shown in FIG. 3C, adjacent auger shafts 28a', 28b' are separated by a divider 29. Like numerical references in FIG. 3c refer to like features previously described. It has been found that separating the auger shafts 28' in this manner also provides some filtering functionality without disposing the auger shafts 28' in an intermeshed manner.

Figure 1C:
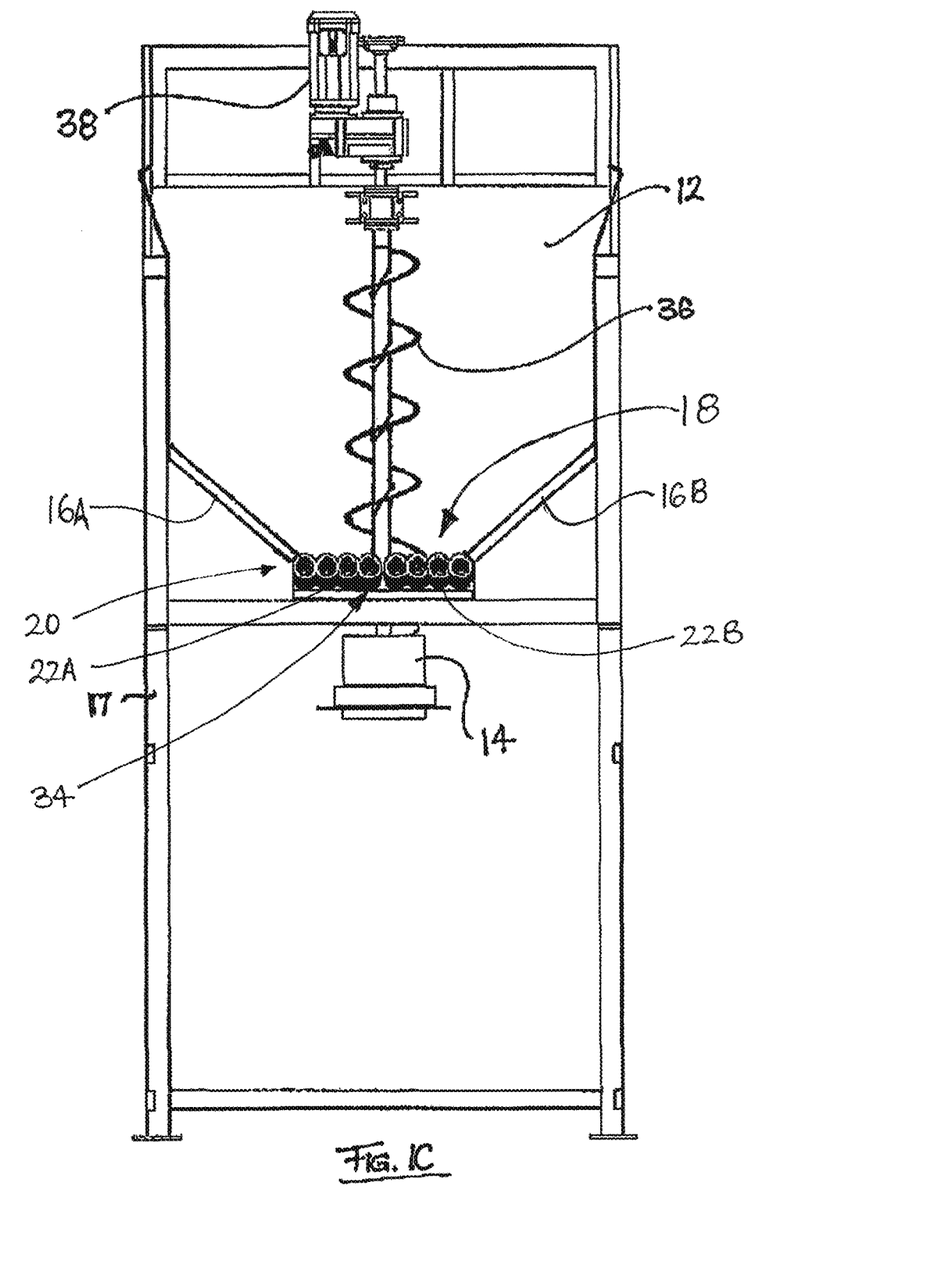
FIG. 1C is a cross-sectional view of section M of FIG. 1A.

Now referring to FIG. 1C, which is a cross-sectional view of section M of FIG. 1A. The body 10 further includes an unloading mechanism in the form of an upright auger shaft 36 to facilitate movement of the organic material through the outlet 14 for unloading the organic material. The rotation of the shaft 36 driven by motor 38 guides and pushes organic material out of the hopper 12 via the outlet 14. The upright auger shaft 36 is aligned with the opening of the outlet 14 so as to effectively direct material out of the outlet 14 during operation.

Figure 4A:
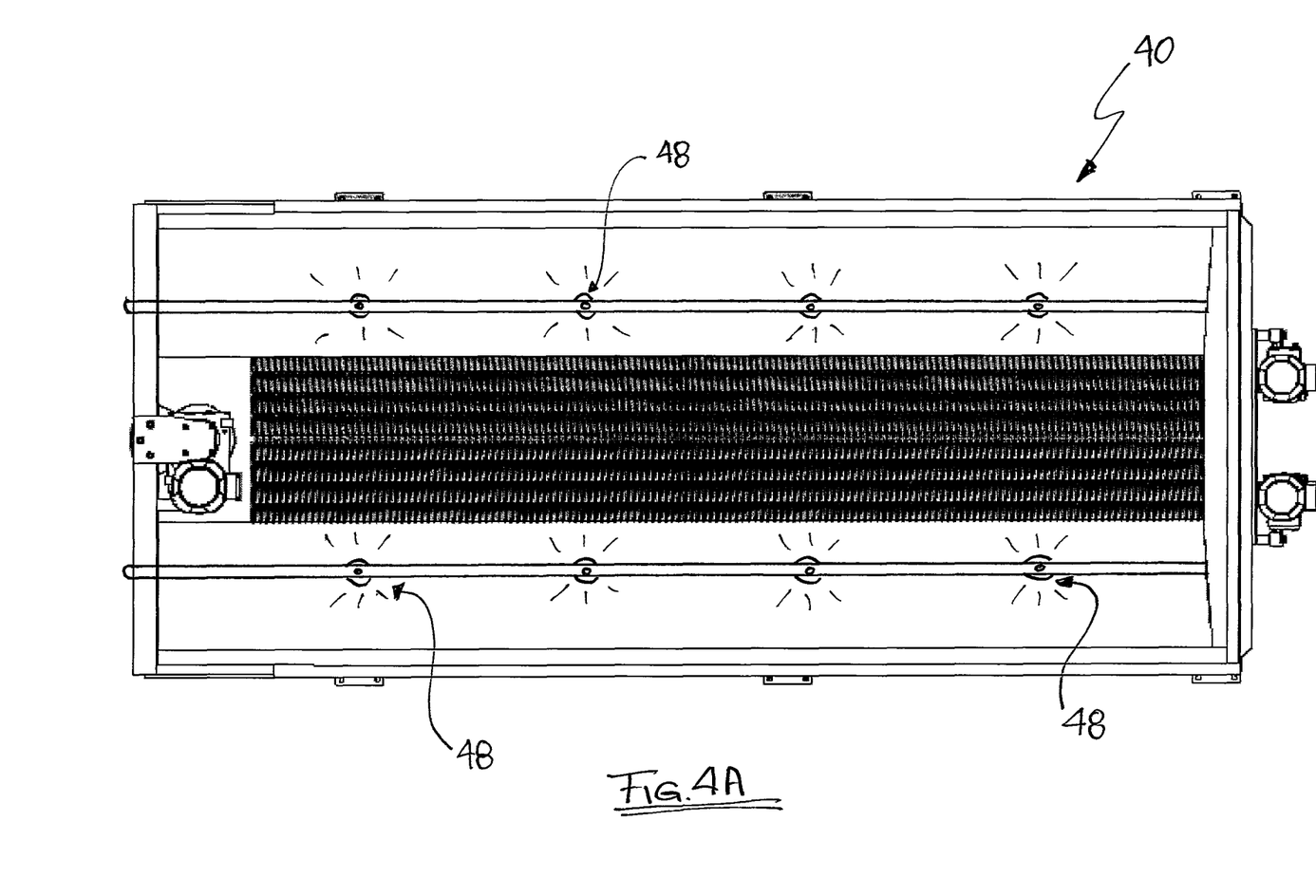
FIGS. 4A and 4B illustrate an apparatus for storing organic material according to an embodiment of the present invention including the body as showing in FIGS. 1A to 2B and the cooling fluid circuit.
Figure 4B:
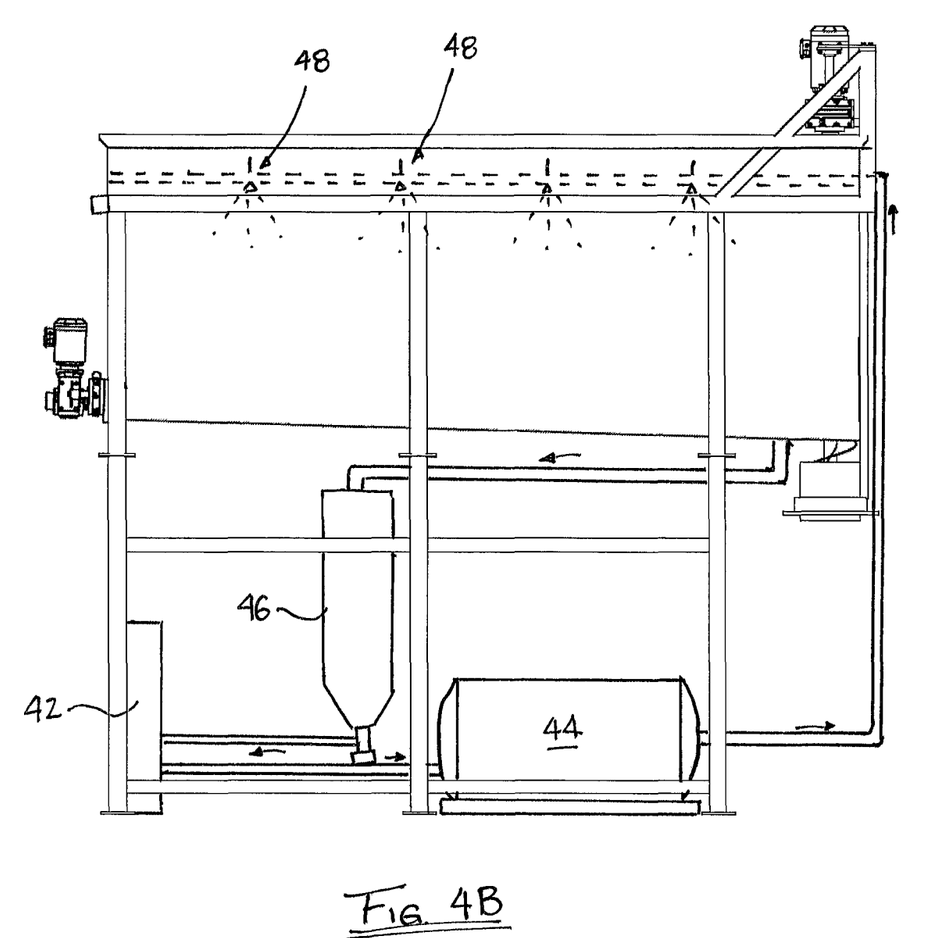

The apparatus 40 for storing the organic material according to an embodiment of the present invention is shown in FIG. 4B. The cooling fluid circuit 40 is shown in FIGS. 4A and 4B. The cooling fluid circuit 40 includes a heat exchanger assembly 42 having an associated circulation pump (hidden), an in-line self-cleaning filter system 46, and an air pressure tank 44 are connected by pipework for circulating cooling fluid within the circuit to chill the organic material in the hopper 12. As shown in FIG. 4B, various components of the circuit 40 are supported within the support frame 17.

The cooling fluid circuit 40 circulates chilled fluid through the organic material carried by the hopper 12 to thereby preserve the organic material. As shown in FIG. 4A, sprinklers 48 are mounted to an open top portion of the hopper 12 for continuously sprinkling chilled water into the hopper 12. The chilled water flows through the organic material carried by the hopper and combines with other fluids from the organic material. The combined fluid is collected at the bottom of the hopper 12 and filtered through the sieve system 30, and then collected in the drain troughs 34. Impurities are then removed from the fluid by passing the fluid through the filter system 46. The filtered fluid is then re-chilled to a predetermined temperature by passing the filtered fluid through the heat exchanger assemble 42. Typically, the predetermined temperature is about 3° C. The re-chilled fluid is pumped back into the hopper 12 via the sprinklers 48. Operation of the cooling fluid circuit 40 is typically controlled by a control panel having PLCs.

Typically, the in line filter system 46 includes an in-line barrel filter and barrel sieve. Instead of conventional flushing or backwash mechanisms, the filter system 46 relies on high speed rotation of the filter barrel creating a centrifugal force to throw off material caught on an external surface of the filter 46. The high speed spinning action is created using compressed air directed onto turbine blades located at one end of the filter barrel. A fine spray of fresh water from a central spray bar located within the sieve barrel can be used to clean the internal surface of the sieve and to wash the material spun off from the filter to waste.

The filter 46 is more clearly illustrated in FIGS. 5A to 5D. The filter 46 includes a barrel shaped housing 52, a sieve barrel 54 located on a central spindle and spray bar 56 within the housing 52. The central spindle and spray bar 56 is typically located along a central elongate axis of the barrel shaped housing 52. The sieve barrel 54 can be made from fine mesh stainless steel or nylon. For larger scale filters 46, the sieve barrel 54 can be made from perforated stainless sheet of wedged wire.

Figure 5A:
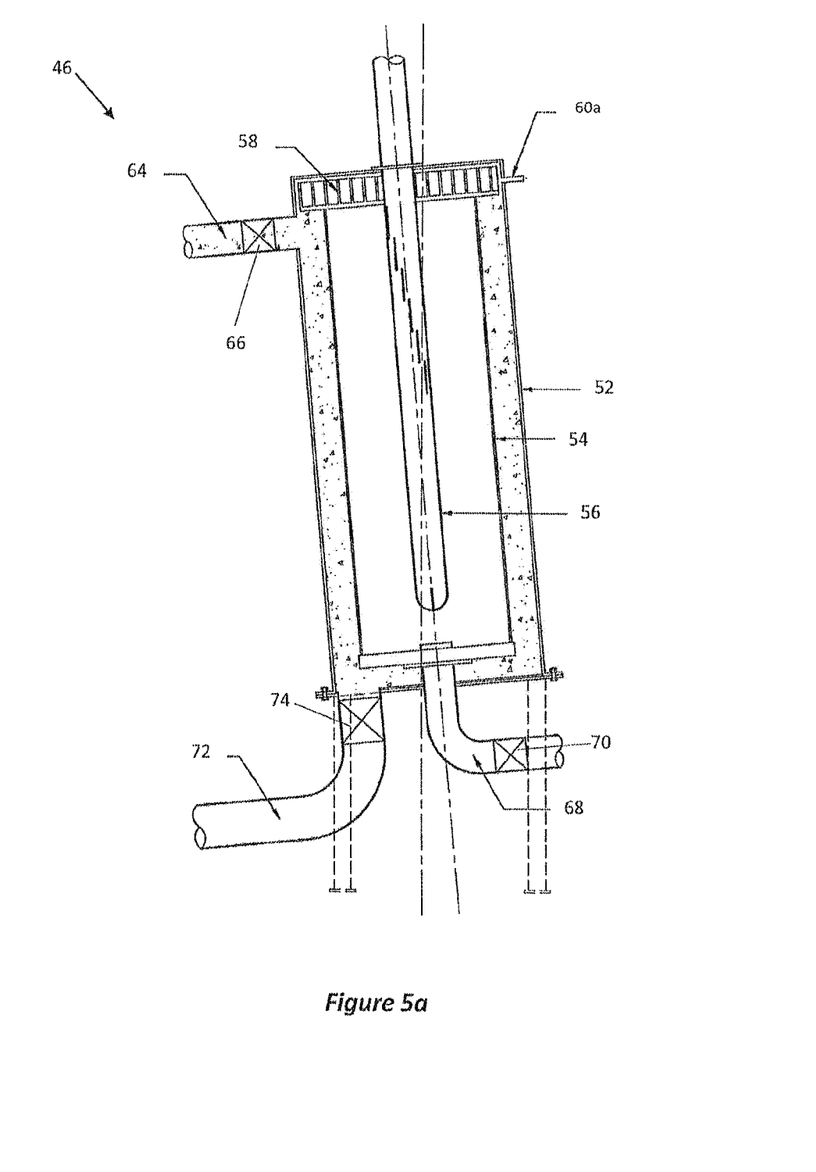
FIGS. 5A to 5C illustrate an in-line self-cleaning filter according to an embodiment of the invention.
Figure 5B:
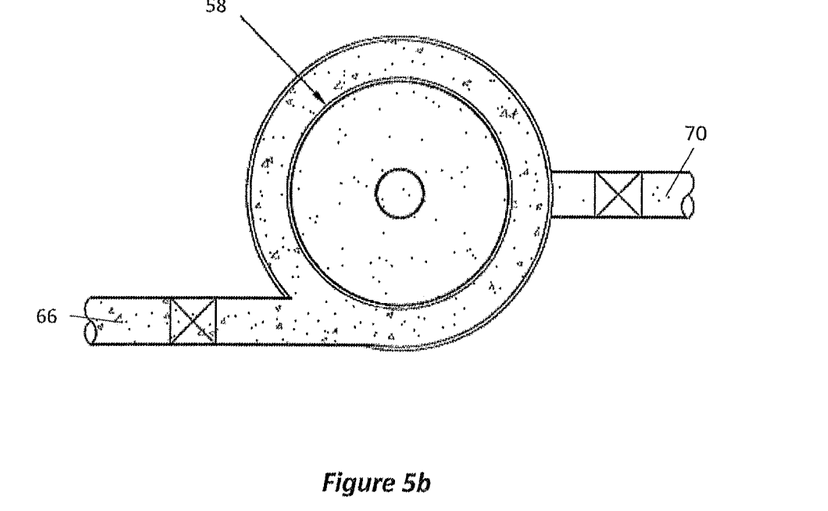
Figure 5C:
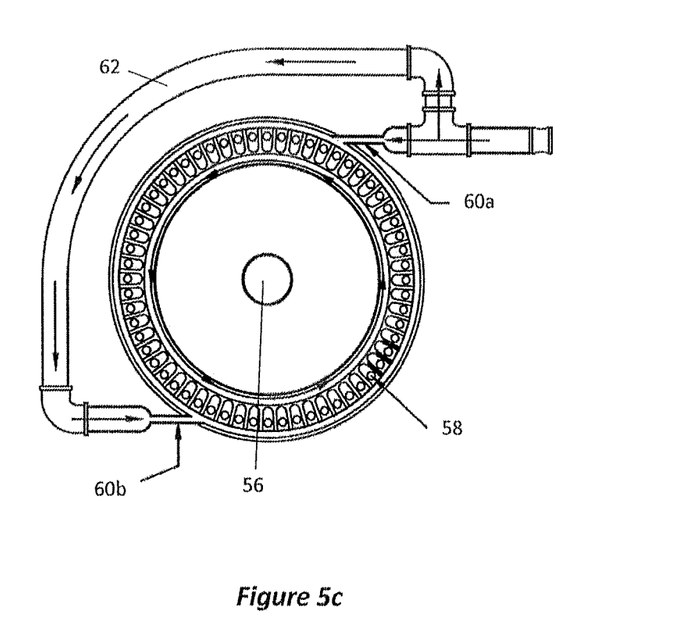
Figure 5D:
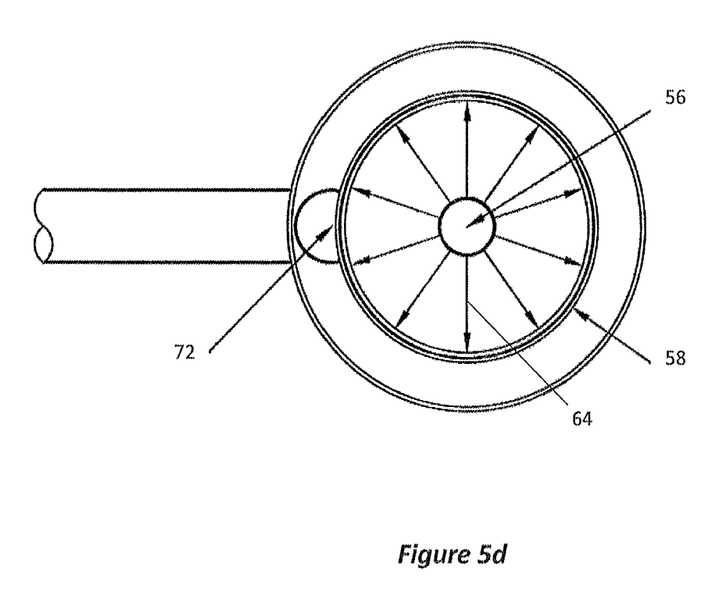

The sieve barrel 54 is generally cylindrical and concentrically located within the housing 52 and fixedly mounted to the spindle and spray bar 56 via a turbine assembly 58 so that the sieve barrel 54 rotates together with the spindle and spray bar 56.

As more clearly shown in FIG. 5C, the rotation of the spindle and spray bar 56 is driven by the turbine assembly 58, which is driven by high pressure fluid (e.g. air or water). The high pressure fluid is injected via inlets 60a, 60b located at opposite ends of a circumference of the turbine 58. The inlets 60a, 60b are connected by pipeline 62. As shown in FIG. 5C, the direction of the high pressure fluid flow will drive the turbine 58 to spin in an anti-clockwise direction.

A fluid flush circuit (not shown) incorporated in the spindle spray bar 56. During flushing operations, the spindle is activated to spray fluid 64 radially outwardly from the spray bar 56 towards the barrel sieve 58. Fluid for spraying is provided by the fluid flush circuit (see FIG. 5D).

During operation of the filter 46, contaminated fluid from the cooling fluid circuit 40 is passed into the filter 46 via inlet 64 controlled by inlet valve 66. Contaminated fluid is passed through the barrel sieve 54 and becomes filtered fluid inside the barrel sieve 54. Filtered fluid exits the filter 46 via outlet 46, which is controlled via outlet valve 70. The filter 46 further provides a waste outlet 72 controlled by waste outlet valve 74. Waste from self-cleaning operations of the filter can be removed via the waste outlet 72. A transducer (not shown) is also provided as each of the inlet 64 and outlet 68 to detect pressure differentials within the filter 46. Once the pressure differential exceeds a predetermined amount (indicating that a large amount of contaminants have collected on the barrel sieve 54), self-cleaning operations may be initiated.

During self-cleaning operations, filtered material builds up on outside of sieve barrel 54 and flow is restricted causing an increasing pressure differential between the transducer in the inlet 64 and the transducer on the outlet 68. Once the pressure differential reaches a predetermined amount, a self-cleaning cycle of the filter 46 is automatically initiated. During the self-cleaning cycle, the filter 46 carries out the following steps:

Stop supply pump and close inlet valve 66 so that fluid from the cooling fluid circuit 40 is no longer being passed into filter 46.

Open high pressure fluid supply so that high pressure fluid enters the filter housing 52 via inlets 60a, 60b. The high pressure fluid forces un-sieved fluid in the filter 46 through the sieve 54 and out through the outlet 70 so as to empty filter 46.

Once the filter 46 is emptied, the outlet valve 70 is closed, which allows pressure to build up within the housing 52 as the high pressure fluid supply continues to pass high pressure fluid into the filter 46.

Open waste outlet valve 74. Pressure built up within the housing 52 will;
  instantly blow out any residual water in the sieve barrel 54; and
  immediately start high speed rotation of sieve barrel 54

While sieve barrel 54 is spinning, open spray water to spray bar 56 to allow fine spray onto internal surface of sieve barrel 54. This spray water will clean the internal surface of sieve barrel 54 and assist removal of contamination from sieve barrel 54.

After a predetermined time, the spray water 64, high pressure fluid supply via inlets 60a, 60b are turned off and any remaining material is allowed to drain through the waste outlet 72.

The waste outlet valve 74 is then closed, and the inlet and outlet valves 66, 70 reopened. The supply pump is restarted and fluid from cooling fluid circuit 40 is passed through the filter 46 to continue operation.

It has been found that the in line filter system 46 provides efficient cleaning of the filter with little to no residual hand up or slime, and minimal water lost during cleaning. The filter system 46 involves simple and reliable operation at low cost. In addition, the RPM of cleaning spin may be easily adjusted to suit the type and volume of filtered material. There is also minimal water lost during self-cleaning. The turbine assembly 58 also provides excellent torque characteristics to overcome sludge overloading in the event that it occurs.

The operation of the apparatus 50 will now be described in relation to the following operating cycles. The operating cycles are controlled by a control panel having PLC controllers (not shown).

1. Standby Cycle

All drain outlets of the apparatus 10 are open, and refrigeration of the heat exchanger 42 and external fluid supply are turned off. The transfer and unloading mechanisms 20, 36 are also inactive.

2. Fill/Chill Cycle

Once organic material is loaded into the hopper 12, the apparatus 50 enters the fill/chill cycle. In this cycle, drain valves of the cooling fluid circuit 40 are closed, and the hopper 12 is filled with chilled water via sprinklers 48 to a predetermined level. The predetermined chilled water level is detected by sensors in the hopper 12.

Chilled water is combined with fluid from the organic material and drained from the hopper 12 via the sieve system 30 and drain troughs 34. The drained fluid is filtered and passed into the heat exchanger 43 so that it can be re-chilled to a predetermined temperature (e.g. 3° C.).

The re-chilled fluid is pumped from the heat exchanger 43 and redirected into the hopper 12 via sprinklers 48.

3. Unload Cycle

The organic material can be unloaded from the hopper 12 for transportation and further processing during the unload cycle.

During the unloading cycle, the exit knife gate at the outlet 14 is opened. The upright auger shaft 36 and the transfer mechanism 20 are activated by activating the independent motors 38, 26a, and 26b to transfer and unload the organic material from the outlet 14. The deactivation of the upright auger shaft 36 advantageously stops the unloading of the organic material without the need to close the knife gate at the outlet 14.

4. Drain Cycle

During the drain cycle, the cooling fluid circuit 40 no longer re-circulates chilled water through the organic material. Pumps in the circuit 40 and refrigeration of the heat exchanger 42 are shut down and turned off. The drain valves are opened and a cleaning cycle of the in-line filter 46 is initiated.

5. Clean in Place (CIP) Wash Cycle A

Wash cycle A is typically used when the hopper 12 is empty after the drain cycle and it is desirable to clean the apparatus 50.

During operation, the drain valves are closed, the fluid circuit 40 is filled with hot water and the heat exchanger 42 pump is used to circulate the hot water through the circuit 40. The sprinklers 48 are on to allow washing of the internal surface of the hopper 12. Additional spray balls are located in the top area of the hopper to specifically wash the roof and top sides of the hopper during the CIP Cycle.

The clean cycle of the in-line filter 46 is also initiated. The apparatus 50 automatically returns to the standby cycle after completion.

6. CIP Wash Cycle B

Wash cycle B is typically used when it is desirable to clean the cooling fluid circuit 40 when the hopper 12 still holds some organic material. During thus cycle, the heat exchanger continues to be used to refrigerate water to be recirculated to chill the organic material. The following steps are executed during wash cycle B:

Pumps shut down
Refrigeration turned off
Clean Cycle of in-line filter initiated
Drain valves opened
Drain valves closed after full draining
System filled with hot water
Spray Pneumatic actuators close sprays into hopper
Heat exchange pump (high pressure—high volume) is circulated throughout the recirculation pipework, shell & tube heat exchanger
The sprays are left closed so pipework is cleaned but no hot water gets into hopper or product
The spray balls are not actuated
On completion hot water is drained and the Fill/Chill Cycle re-started It will be appreciated that the collection and storage apparatus 50 of the present invention provides a point for collecting and storing offal that quickly places the collected offal in a state suitable for storage and maintains the offal in a state of freshness for collection. By quickly applying chilled water to the collected offal, which may be initially at around 38° C., the chilled water can be recirculated through the material rapidly reducing the temperature of the material to a temperature suitable for storage, for example, around 4° C. Thus the hopper apparatus is able to store the material for longer, without requiring much operator support.

By providing numerous abattoirs with this apparatus, a processing plant, such as a pet food processing plant, can better plan pick-up of offal from the various sites and is no longer dictated by time limits whereby the offal will lose its freshness and no longer be suitable for processing.

Such a system of providing the hopper apparatus on-site at the abattoir enables owners and operators of processing plants the ability to remotely monitor the collected material via the hopper apparatus such that transport logistics can be better staggered and co-ordinated to pick-up the material from the various abattoir sites without the material becoming unusable by being stored at too high temperatures. As will be appreciated by those skilled in the art, the ability to better manage logistics associated with the collection and storage of the organic material, significant costs savings can be made and wastage reduced, resulting in a system of collecting organic material that is more profitable and user friendly.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the hopper uppermost.

It will be appreciated by those skilled in the art that many modifications and variations may be made to the methods of the invention described herein without departing from the spirit and scope of the invention.

The claims defining the invention are as follows:

1. An apparatus for storing organic materials, the apparatus including:
    a hopper having an opening for receiving and storing the organic materials;
    an outlet formed in the hopper through which the organic materials are unloaded from the hopper;
    a cooling fluid circuit for circulating cooling fluid through the organic material stored in the hopper; and
    a transfer mechanism mounted in a floor of the hopper to receive the organic materials;
    wherein the transfer mechanism comprises two or more auger shafts that extend along a length of the floor of the hopper and are rotatable to move the organic material along the floor of the hopper towards the outlet; the two or more auger shafts further forming a sieve for draining fluid from the hopper for circulation by the cooling fluid circuit.

2. The apparatus according to claim 1, wherein the hopper comprises a drain trough for collecting the fluid drained from the transfer mechanism.

3. The apparatus according to claim 2, wherein the drain trough extends a length of the floor of the hopper.

4. The apparatus according to claim 3, wherein the drain trough is connected to the cooling fluid circuit.

5. The apparatus according to claim 3, wherein each auger shaft has a drain trough for receiving the draining fluid.

6. The apparatus according to claim 1, further comprising an unloading mechanism to facilitate movement of the organic material through the outlet for unloading the organic material.

7. The apparatus according to claim 6, wherein the unloading mechanism includes an auger shaft extending along a length of the outlet, the auger shaft being configured to rotate about its central axis to facilitate unloading of the organic material from the outlet.

8. The apparatus according to claim 1, wherein the cooling fluid circuit comprises a heat exchanger for maintaining the cooling fluid below a predetermined temperature.

9. The apparatus according to claim 8, wherein the cooling fluid circuit further includes a filter for filtering the cooling fluid.

10. The apparatus according to claim 9, wherein the filter is self-cleaning and includes an in-line barrel filter and barrel sieve.

\* \* \* \* \*